No. 648,948. Patented May 8, 1900.
C. M. HANCOCK.
AUTOMATIC WAGON BRAKE.
(Application filed Jan. 11, 1900.)

(No Model.) 2 Sheets—Sheet 1.

Witnesses
Howard D. Orr
J. W. Garner

Chas. M. Hancock,
Inventor
By his Attorneys,
C. A. Snow & Co.

No. 648,948. Patented May 8, 1900.
C. M. HANCOCK.
AUTOMATIC WAGON BRAKE.
(Application filed Jan. 11, 1900.)
(No Model.) 2 Sheets—Sheet 2.
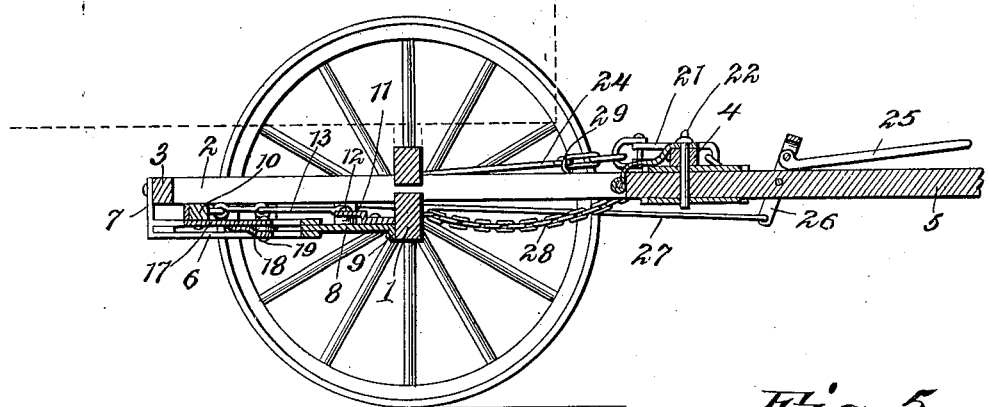
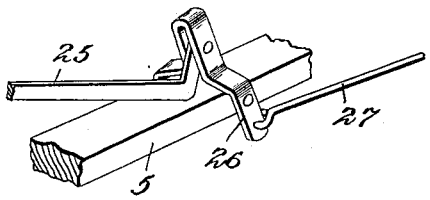
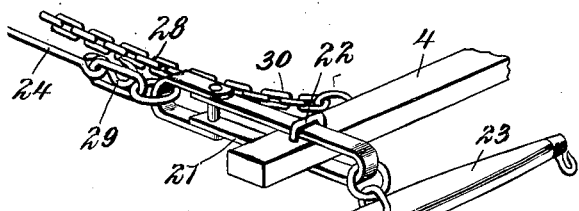
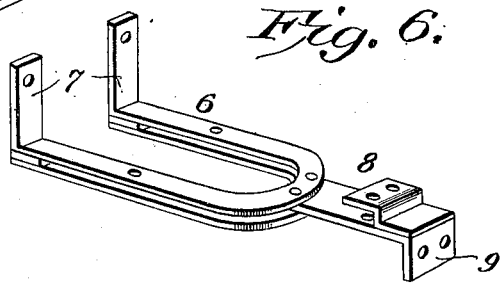
Witnesses
Howard D. Orr.
J W Garner
By his Attorneys,
Inventor
Chas. M. Hancock.
C A Snow & Co.

UNITED STATES PATENT OFFICE.

CHARLES M. HANCOCK, OF PARIS, TENNESSEE, ASSIGNOR OF ONE-HALF TO JAMES D. BODEN, OF SAME PLACE.

AUTOMATIC WAGON-BRAKE.

SPECIFICATION forming part of Letters Patent No. 648,948, dated May 8, 1900.

Application filed January 11, 1900. Serial No. 1,159. (No model.)

*To all whom it may concern:*

Be it known that I, CHARLES M. HANCOCK, a citizen of the United States, residing at Paris, in the county of Henry and State of Tennessee, have invented a new and useful Automatic Wagon-Brake, of which the following is a specification.

My invention is an improved automatic brake for the front wheels of wagons and other vehicles, the object of my invention being to provide a brake carried on the front truck of the wagon with spring-actuated devices to automatically apply the brakes when the draft slackens and releasing devices, through which the draft is applied to the vehicle, connected to the brake-applying devices to automatically release the brakes when the vehicle is under draft.

To these ends my invention consists in the combination, with the brake-beam, of the spring-actuated brake-levers connected thereto and adapted to apply the brake-shoes to the wheel and draft or releasing levers connected to the brake-beam and the brake-levers and adapted to release the brakes from the wheels.

My invention further consists in the peculiar construction and combination of devices hereinafter fully set forth, and particularly pointed out in the claims.

Figure 1:
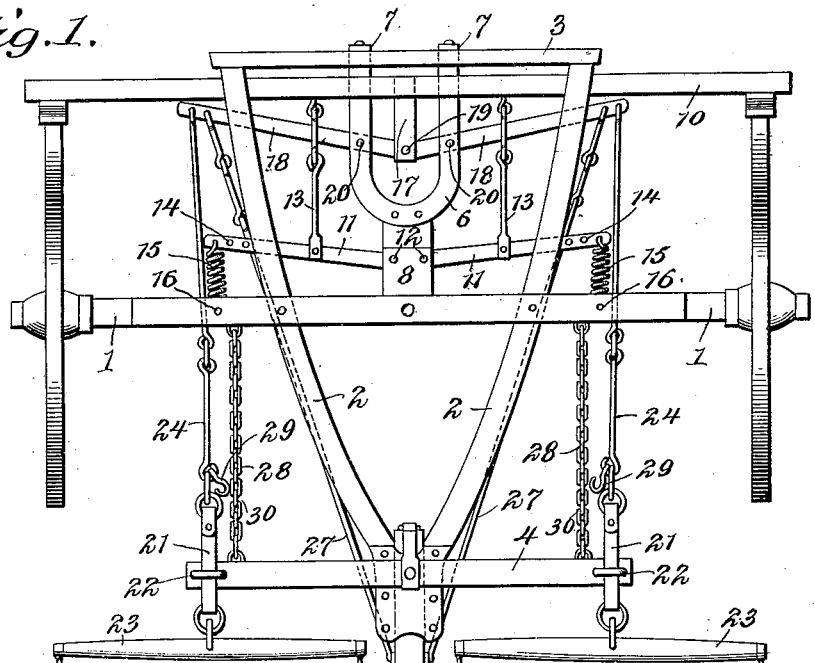
Figure 2:
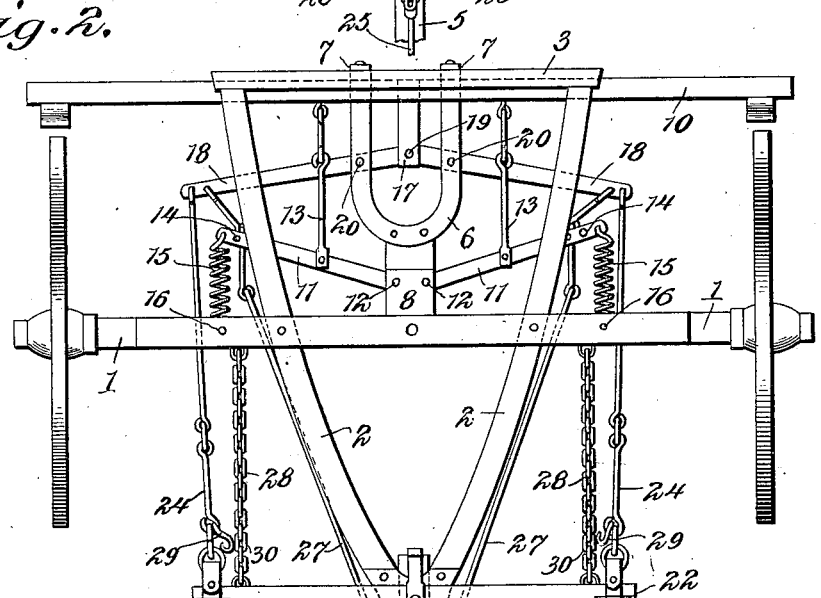

In the accompanying drawings, Figure 1 is a top plan view of the front truck of a vehicle provided with my improved automatic brake, showing the brake applied. Fig. 2 is a similar view showing the brake released. Fig. 3 is a vertical longitudinal sectional view taken on the line *x x* of Fig. 1. Figs. 4, 5, and 6 are detail views.

The front axle 1, the hounds 2, and the cross-bar 3, connecting the rear ends of the hounds, together with the doubletree 4 and tongue 5, are of the usual construction of the front truck of a vehicle.

In the construction of an automatic wagon-brake embodying my improvements 6 represents a substantially U-shaped bridge-frame, which has the rear ends of its side arms upturned, as at 7, and bolted to the rear side of the cross-bar 3 and is provided at the forward junction of its side bars with the extension 8, the front end of which is downturned, as at 9, and bolted to the axle.

The brake-beam 10 is supported on the side arms of the bridge-frame and is adapted to move back and forth thereon and is connected to a pair of brake-applying levers 11, which are pivoted to the forward extension of the bridge-frame, as at 12, suitable links or chains 13 being employed to connect the said brake-applying levers to the brake-beam. The said levers 11 are provided at their outer ends with series of openings 14, to which are hooked or linked the rear ends of coiled retractile springs 15, the front ends of which springs are hooked or linked to the axle, as at 16. The said springs draw forward normally on the levers 11, and as the latter are connected to the brake-beam serve to normally apply the brakes to the front wheel, as shown in Fig. 1. By reason of the series of openings 14, with which each of the brake-applying levers is provided, the tension of the said springs on said levers may be varied at will and as may be required under varying conditions.

An arm, plate, or bracket 17 is secured to the center of the brake-beam and projects forward therefrom, and to the said arm, plate, or bracket are pivotally connected the inner ends of a pair of brake-releasing or draft levers 18, as at 19, the said levers being fulcrumed to the side arms of the bridge-frame on the bolts 20. On the ends of the doubletree are longitudinally-movable cuffs or links 21, secured thereon against lateral displacement by U-shaped bolts 22, and these cuffs or links are connected at their front ends to the singletrees 23 and have their rear ends connected to the outer ends of the brake-releasing levers 18 by the chains or link-rods 24. A hand-lever 25 is fulcrumed on the tongue and has depending arms 26, which are also connected with the brake-releasing levers 18 by the chains or link-rods 27. The usual draft-chains 28 connect the ends of the doubletree with the front axle 1.

The operation of my improved automatic wagon-brake is as follows: When the vehicle is at rest or is descending an incline or when for any other cause the draft slackens, the spring-actuated levers 11 draw forward on the brake-beam and automatically apply the brake-shoes to the front wheels and maintain the brake-beam in position, with the brakes applied. When the team starts or an upgrade is reached, the draft on the singletrees causes them to move forward and to draw upon the brake-releasing levers 18, to which they are connected, and the said levers 18, being connected to the brake-beam through the arm, plate, or bracket 17, rearward motion is imparted to the brake-beam, and the same is caused to remove the brake-shoes from the wheels.

It will be understood from the foregoing that my improved wagon-brake is automatic in its operation and is adapted to apply the brakes to the wheels whenever the draft slackens and to remove the brakes from the wheels at the instant draft is applied to the vehicle.

As here shown and described my automatic brake is applied to a two-horse wagon; but it will be readily understood that my brake may be used on a one-horse wagon with equal efficiency.

By means of the hand-lever the brake-applying apparatus may be caused to release the brake at any time desired. When it is not desired to use the brake apparatus, the same may be secured in inoperative position by engaging hooks 29 (with which the chains or link-rods 24 are provided) with the links 30, which serve to connect the front ends of the draft-chains 28 to the doubletrees.

Inasmuch as my improved automatic brake is attached to the front truck and adapted to be used on the front wheels of the vehicle, the same is efficient under all conditions in which the vehicle is used, and the operation of the same is not interfered with by the turning of the front axle on the king-bolt or fifth-wheel.

Having thus described my invention, I claim—

1. In an automatic vehicle-brake, the brake-beam, in combination with the brake-releasing levers 18, connected to said beam, said levers sustaining the draft; the brake-applying levers 11, connected to the brake-beam, whereby said brake-releasing and brake-applying levers are adapted to move in unison, and springs applied to said brake-applying levers, and normally restraining the application of the brakes, substantially as described.

2. A vehicle front truck provided with axle, hounds, and bridge, in combination with the automatic brake, comprising a brake-beam, the brake-applying levers 11, pivoted to the bridge, connected to the brake-beam and having the springs normally restraining the application of the brakes; the brake-releasing levers 18, fulcrumed to the bridge, a connection between the inner ends of said levers and the brake-beam, and draft rods or chains connected to the outer ends of said levers 18, all combined and adapted to operate, substantially as described.

3. The combination, in an automatic wagon-brake, of the bridge-frame supporting the brake-beam, the releasing-levers fulcrumed to said frame and connected to the brake-beam, said releasing-levers sustaining the draft, and the spring-actuated brake-applying levers pivoted to said bridge-frame and connected to said brake-beam, substantially as described.

4. The combination, in an automatic wagon-brake, of the bridge-frame supported by the axle and hounds, the brake-beam supported by said frame, the spring-actuated brake-applying levers pivoted to said frame and connected to the beam, and the brake-releasing and draft-sustaining levers fulcrumed on said bridge-frame and connected to the brake-beam, substantially as described.

In testimony that I claim the foregoing as my own I have hereto affixed my signature in the presence of witnesses.

CHAS. M. HANCOCK.

Witnesses:
 FELIX F. PORTER, Jr.,
 JOS. A. PATTERSON,
 JOHN C. SWEENEY.